May 3, 1932. J. STEIN 1,856,595
DECORATIVE RUBBERIZED CLOTH AND METHOD OF PRODUCING SAME
Filed Jan. 2, 1930 2 Sheets-Sheet 1
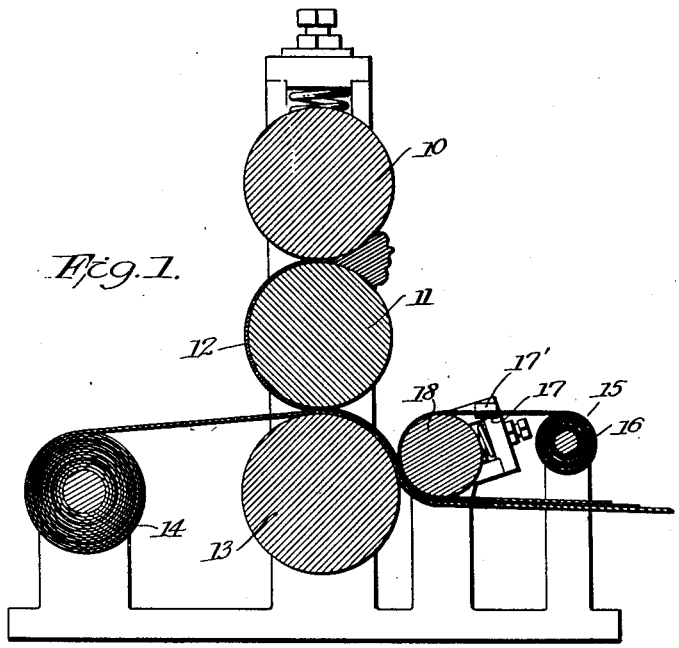
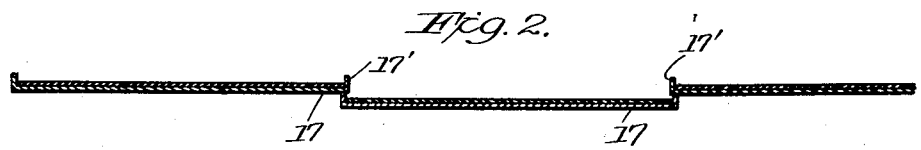
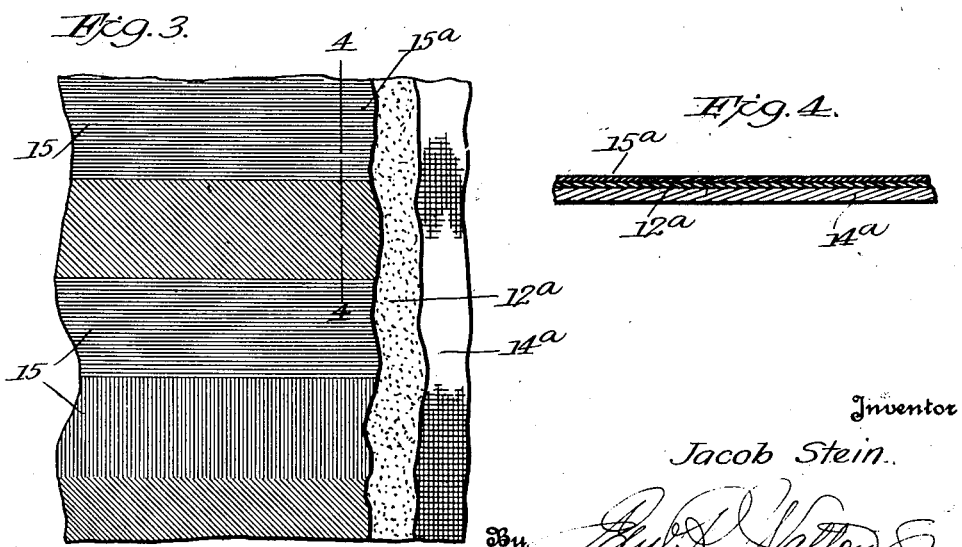
Inventor
Jacob Stein May 3, 1932.   J. STEIN   1,856,595
DECORATIVE RUBBERIZED CLOTH AND METHOD OF PRODUCING SAME
Filed Jan. 2, 1930   2 Sheets-Sheet 2
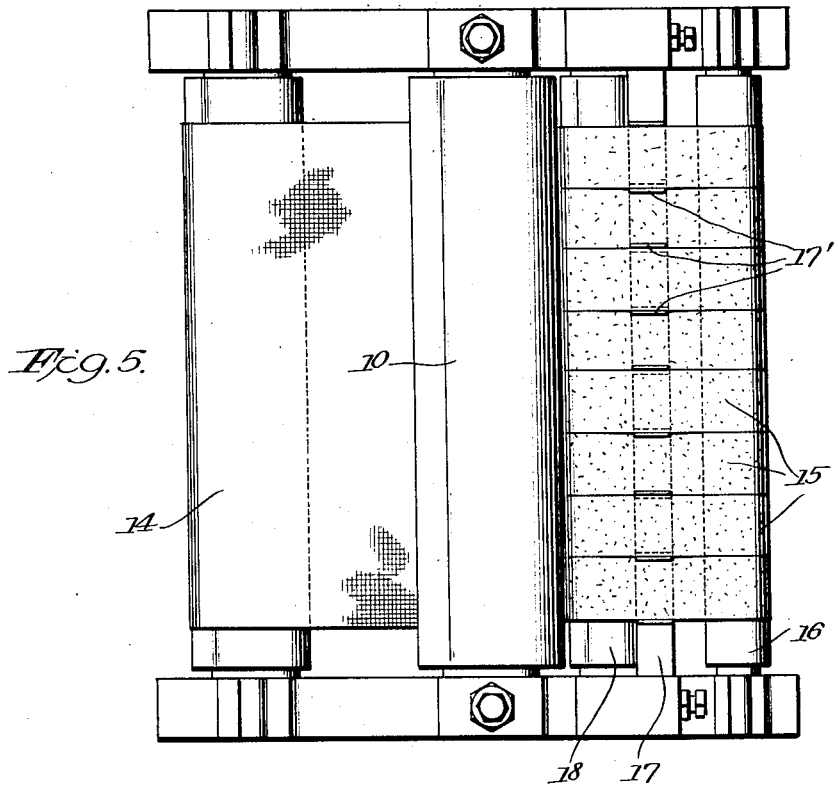
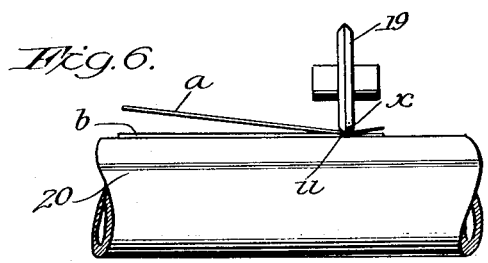
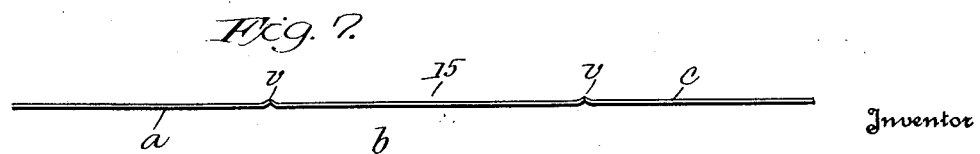
Inventor
Jacob Stein Patented May 3, 1932

1,856,595

UNITED STATES PATENT OFFICE

JACOB STEIN, OF BROOKLYN, NEW YORK

DECORATIVE RUBBERIZED CLOTH AND METHOD OF PRODUCING SAME

Application filed January 2, 1930. Serial No. 418,110.

The present invention relates to rubberized cloth or textile fabric having a decorative lamina of rubber or textile material, and the method of producing the same.

While it is known that uncured rubber sheets or strips may be united together by a calendering operation, it is also well known that rubber strips or sheets can only be calendered to cloth or textile fabrics while the rubber is in a hot plastic condition, usually as the result of mastication by grinding.

After the rubber has been sheeted by calendering, dusted with starch or talcum (as is usually the case to permit handling and prevent the rubber from sticking to itself or superposed layers of rubber), and allowed to cool, such rubber sheets or strips will not permanently adhere or unite with cloth or other textile fabric by a further calendering operation irrespective of the degree of heat and pressure which may be applied. Therefore, it is necessary, in order to produce rubberized or rubber-coated fabric by calender operation, to pass the cloth and rubber through the calender while the rubber is in its hot plastic state.

In view of this phenomenon, rubberized or rubber calendered cloth or fabric has not been produced, where the rubber lamina was in variegating color stripes, due to the expense and impracticability of running batches of masticated plastic rubber of varying color through the calender simultaneously to produce desirable definite stripe color effects upon the cloth or fabric being passed through the calender; and, further due to the fact that rubber strips of variegating color prepared in advance (cooled, dusted and cut to desired width) would not adhere or unite by calender operation directly to the fabric for the reasons above stated.

In my previous Patents Nos. 1,603,812 and 1,603,813, I have shown a method and apparatus for producing a multi-striped sheet rubber of variegating color by a single calender operation, and of course this multi-striped rubber sheet could be calendered directly to cloth or other fabric when the two are passed through at the same time, but, the method and apparatus disclosed in these patents is very costly and for this reason prohibitive for ordinary uses and purposes.

I have found, however, that multi-colored striped rubberized cloth can be very efficiently and economically produced by the present method herein described and claimed. However, it is to be understood that certain modifications and variations may be resorted to in the method herein shown and described without departing from the spirit of this invention; and, while the present disclosure is at present considered to be the preferred process or embodiment of the invention, it is only referred to by way of example.

In order that the invention and the manner of carrying out its process of manufacture may be better understood reference may be had to the accompanying drawings, in which—

Fig. 1 is a diagrammatic sectional illustration of a calender showing the arrangement of the various parts and the manner in which the materials are passed therethrough;

Fig. 2 is a fragmentary longitudinal sectional view of the colored rubber strip guide means showing the character of guide which may be used;

Fig. 3 is a fragmentary plan of the laminated cloth resulting from the present invention; and Fig. 4 is a transverse sectional view taken substantially on line 4—4 of Fig. 3 to show the various laminæ of the product.

Fig. 5 is a plan view of Fig. 1;

Fig. 6 is a diagrammatic view showing the "cutting on" method of building up a sheet of variegated striped rubber; and Fig. 7 is an edge view of a sheet composed of a plurality of variegated colored stripes built up in the manner illustrated in Fig. 6.

To practice the present invention, a batch of rubber R, preferably of so-called "white latex stock", is masticated in the usual grinding mill or otherwise rendered in a soft semi-molten plastic state, as is usual previous to sheeting out the rubber through a calender. The batch R so provided is placed against two calender rolls 10 and 11 in the usual manner to provide the sheet 12 partially passing around the roller 11 where it again passes between the roller 11 and the roller 13 as usually provided. The calender rollers 10, 11 and 13 are preferably heated. A reel of cloth or other fabric 14 is rotatably mounted and disposed with respect to the calender so that the cloth may be led between the rollers 11 and 13 together with the rubber sheet 12. The cloth 14 and the calendered rubber sheet 12 at this point will be united together by calendering, which is well known in the art.

Before the rubber sheet 12 has become cooled and while it is still in its plastic condition, rubber of variegating colored stripes is applied to the exposed surface of the rubber sheet 12 and calendered thereon in the usual manner by heat and pressure.

To accomplish this, a number of different colored strips of rubber from previously calendered stock and of desired width and color, are cut and wound into reels 15 which are placed side by side on shaft or beam 16 in the desired coloring arrangement. The beam 16 is, preferably but not necessarily, disposed on the discharge side of the calender and extending across the same. As the calendered cloth 14 passes from between the calender rollers 11 and 13, the strips 15 are feeding edge to edge to the top of the rubber sheet 12 which has been just calendered or united to the cloth 14 and which is still in its hot plastic condition. Now the three laminæ are subjected to pressure. To this end a pressure roller 18 may be mounted to oppose and cooperate with the calender roller 13, as shown in Fig. 1. By reason of the hot plastic condition of the rubber 12 and the uncured state of the strips 15, they will fuse together under the pressure of the roller 18 to one homogeneous mass.

In some instances it may be desirable to position the calender roller 18 at a point distant from the calender roller 13 and to provide an additional roller (not shown) which will cooperate with the roller 18.

After the calender operation just described, the material may be subjected to a suitable process for curing or partially curing the rubber as may be desired.

Where the colored stripes of rubber are presented to the calender rolls 13 and 18 in the form of a plurality of separated strips arranged edge to edge, it may be desirable to present these strips so that their edges will abut or slightly overlap in the finished product. To this end, a plurality of gauges 17 are provided, one for each strip and so arranged with respect to their adjacent gauges that the distance between them or the thickness of their separating or guiding walls will be compensated for.

In the present disclosure this is done by arranging each gauge 17 in staggered arrangement, or one alternately above the other to allow for the thickness of the side guide walls 17' thereof.

It is to be understood of course, that the multi-colored rubber materials may be presented in single sheet form to the rubber-coated surface of the cloth 14. This may be done by joining the adjacent edges of the colored strips by what is known in the art as "cutting on" operations. This "cutting on" is accomplished by superposing two strips of uncured rubber and cutting them with a suitable cutting implement 19. This implement will not only sever the two strips $a$ and $b$ at the point $x$ but will unite adjacent severed edges, as illustrated at $u$ in Fig. 6. A rubber sheet of variegating colors may be built up in this fashion of any desired width and presented to the calender roll 18 in the same manner previously described in connection with the separate strips 15.

The laminated fabric thus produced and shown in Figs. 3 and 4, consists of a cloth or other textile fabric surface $14^a$ on one side and of a multi-colored striped rubber surface $15^a$ on the other side, united by an intermediate lamina of rubber $12^a$ throughout their contacting areas.

Since the invention in its broadest aspect is the production of a rubberized textile fabric having a decorative lamina, the lamina $15^a$ may be of other material such as a decorative cloth, lace or the like and would be applied and united to the lamina $12^a$ in the same manner as above described.

Having thus described the invention and what manner the same may be performed, what is claimed as new and desired to secure by Letters Patent of the United States is:

1. The method of producing multi-striped sheet rubber including calendering sheet rubber in plastic condition onto a surface of cloth or other textile fabric; applying to the rubber surface of said laminæ, while in hot plastic condition, a lamina of multi-colored striped rubber; and subjecting the resultant laminæ to pressure.

2. The method of producing multi-striped sheet rubber including calendering sheet rubber in plastic condition onto a surface of cloth or other textile fabric; applying to the rubber surface of said laminæ, while in hot plastic condition, a plurality of strips of rubber of varying color; and subjecting the resultant laminæ to heat and pressure.

3. The method of producing multi-colored rubberized sheets including calendering sheet rubber in plastic condition onto a surface of cloth or other textile fabric, arranging a plurality of strips of said rubber of varying colors in desired color arrangement, feeding said strips to a rubberized surface of calendered cloth while said rubberized surface is in a plastic condition, and subjecting the resultant laminæ to a calendering operation, whereby the three layers are united.

In testimony whereof I have hereunto set my hand.

JACOB STEIN.